Sept. 9, 1930. J. BULKOWSKI 1,775,157
COMBINED HEATING AND COOKING STOVE
Filed Jan. 16, 1930 2 Sheets-Sheet 1
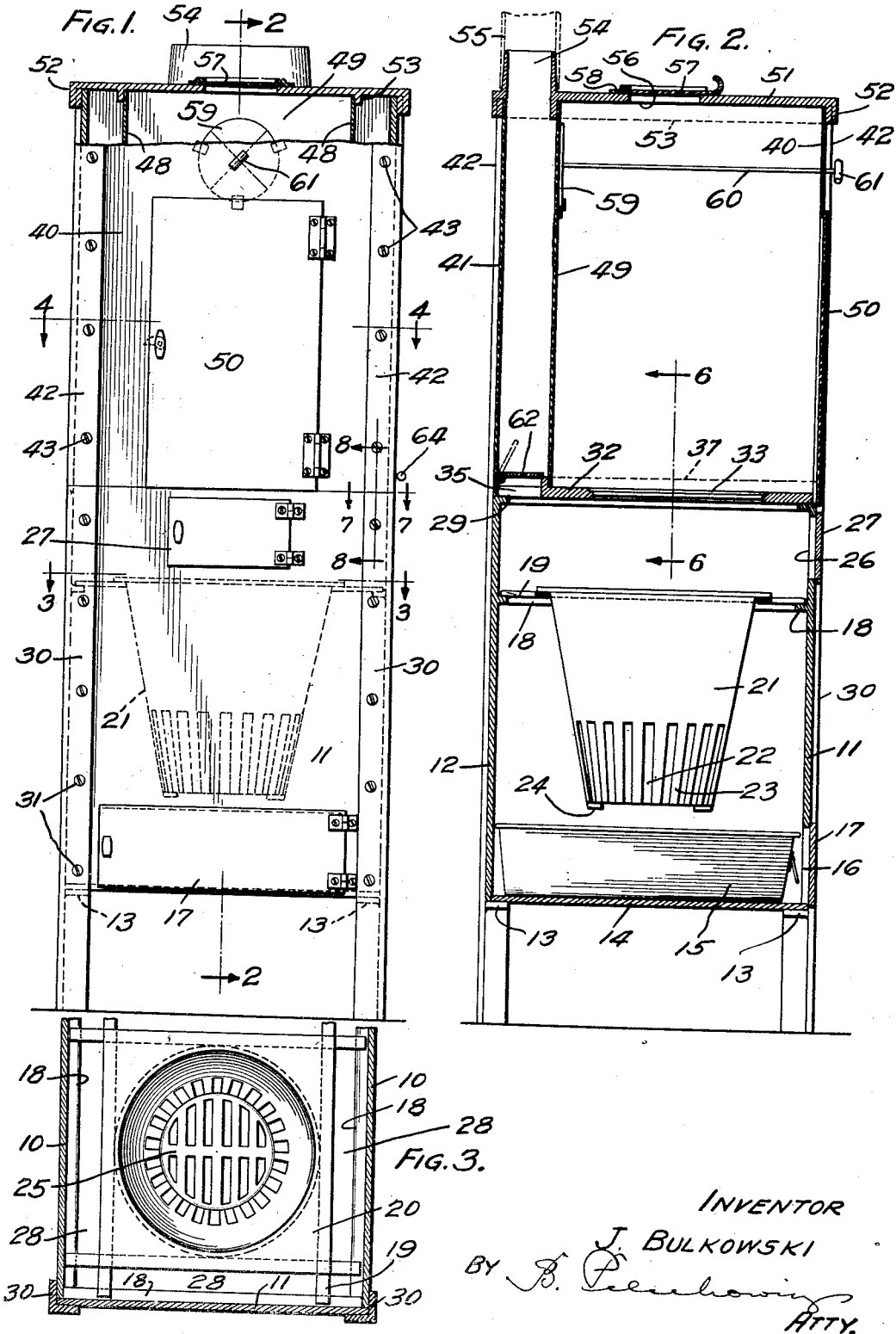
INVENTOR
J. BULKOWSKI
BY
ATTY.

Sept. 9, 1930.  J. BULKOWSKI  1,775,157
COMBINED HEATING AND COOKING STOVE
Filed Jan. 16, 1930  2 Sheets-Sheet 2
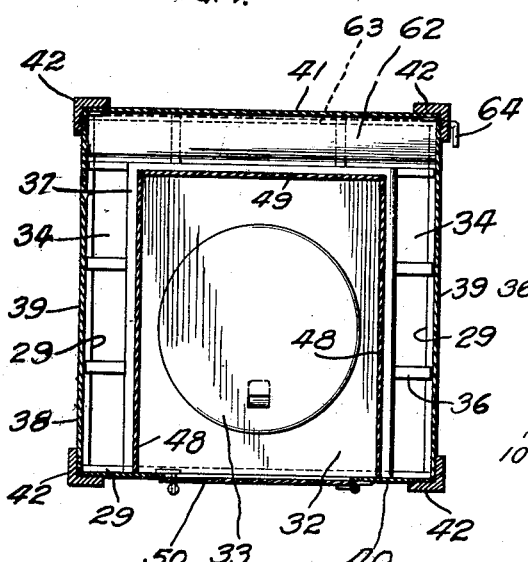
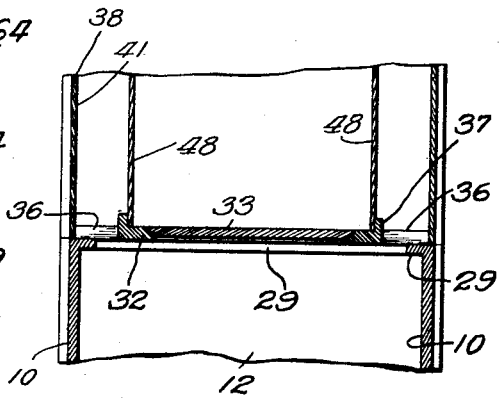
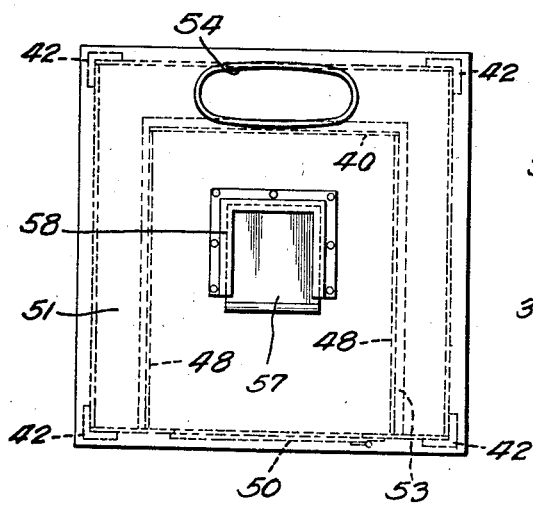
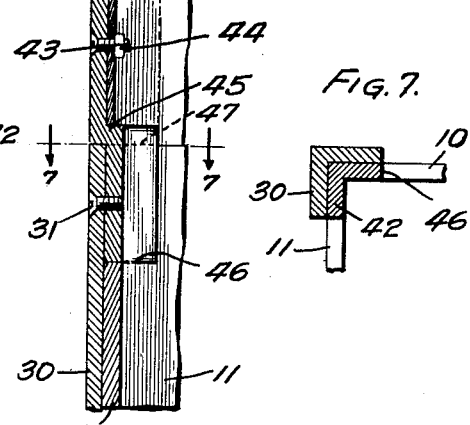
INVENTOR
J. BULKOWSKI
BY
ATTY.

Patented Sept. 9, 1930

1,775,157

UNITED STATES PATENT OFFICE

JOSEPH BULKOWSKI, OF CHICAGO, ILLINOIS

COMBINED HEATING AND COOKING STOVE

Application filed January 16, 1930. Serial No. 421,131.

The present invention relates to stoves, its principal object being the provision of a combined heating and cooking stove.

A further object of the invention is the provision of a stove made of many component parts which may be easily assembled or disassembled.

A still further object of the present invention is the provision of a stove of the character indicated, which may have fire section and cooking section, and in which heat generated in and escaping from the fire section may be uniformly distributed in and about the cooking section.

A still further object of the present invention is the provision of a stove of the character indicated which may have a cooking section made of two walls between which heat may be uniformly distributed.

With the above general objects in view and others that will appear as the nature of the invention is better understood, the same consists in the novel combination, construction and arrangement of parts hereinafter more fully described, illustrated in the accompanying drawings and pointed out in the appended claims.

In the drawing forming a part of this application, and in which like designating characters refer to corresponding parts throughout the several views, Fig. 1 is a front elevational view, partly in section, of the stove;

Fig. 2 is a side cross-sectional view of the stove, taken on line 2—2 of Fig. 1;

Fig. 3 is a horizontal cross-sectional view, partly broken away, taken on line 3—3 of Fig. 1;

Fig. 4 is a horizontal cross-sectional view of the stove, on line 4—4 of Fig. 1;

Fig. 5 is a top elevational view of the stove;

Fig. 6 is a cross-sectional view taken on line 6—6 of Fig. 2;

Fig. 7 is a cross-sectional view of a detail of the stove corner, taken on line 7—7 of Figs. 1 and 8; and Fig. 8 is a cross-sectional view taken on line 8—8 of Fig. 1.

Referring in detail to the present drawings the stove embodies a lower or fire section made of two side walls 10, front wall 11 and rear wall 12, said walls being preferably made of cast iron and are comparatively substantial in thickness, and when the same are in assembled position will constitute a box-like structure. Each of the side walls 10 has at its lower end and adjacent each of its side edges integrally formed and horizontally projecting lugs 13 for supporting thereupon the bottom wall 14 which fits within the four vertical walls of the fire section, as clearly seen on Fig. 2. Said bottom wall 14 is adapted to support ash pan 15 which is withdrawn and inserted through opening 16 made in the front wall 11 which is normally covered by door 17.

Adjacent the upper end of the fire section, each of the four walls has an integrally formed and inwardly projecting ledge 18, for the purpose of providing a support for a lattice frame 19 upon which plate 20 is adapted to rest. Integrally formed and downwardly projecting from said plate 20 is a fire pot 21 of a frusto-conical shape, which remains suspended upon said plate 20 and which remains above the ash pan 15. The lower end of said fire pot 21 is serrated with the resultant slots 22 and prongs 23 for providing means for ashes to fall down through said slots 22 to the ash pan 15. Two or more oppositely disposed prongs 23 have horizontal, integrally formed and inwardly bent lugs 24 for supporting thereupon removable grate 25.

Above the plane of plate 20 the front wall 11 has an opening 26 made therein which is closed by door 27 and through which fuel is supplied to fire pot 21.

It is to be observed that plate 20 is of smaller dimension than the fire section on horizontal plane, which arrangement affords openings 28 through which gases and heat may be permitted to escape upwardly, other than those generated in fire pot 21.

At the upper ends each side plate 10, front plate 11 and rear plate 12 of the fire section of the stove is provided with an integrally formed and inwardly bent horizontal ledge 29, for supporting thereupon other parts of the present invention which will be hereinafter described.

Said side walls 10, front wall 11 and rear wall 12 of the fire section of the stove are connected by means of angle bars 30 which rigidly hold the several walls in their operative position by means of screws 31 passing through the adjacent edges of the several walls. These angle bars by their lower ends extend below the bottom plate 14 and the free ends thereof constitute supporting legs for the stove.

The invention further includes a cooking plate 32 having a usual stove lid 33, said cooking plate 32 by its front edge resting upon ledge 29 formed with the front wall 11 of the fire section of the stove, and otherwise it being reduced in size so that the other edges thereof are spaced from the rear and side walls of the stove affecting side openings 34 and rear opening 35 permitting the heat and gases generated in the fire section of the stove to pass to the cooking section thereof.

On the plane thereof and rigidly formed therewith said cooking plate 32 has a plurality of arms 36 extending from its side and rear edges which rest upon ledges 29 formed with side walls 10 and rear wall 12 of the fire section of the stove, which arms 36 further support said cooking plate 32 upon and above the fire section of the stove. Said plate 32 at its side and rear edges is further provided with an upwardly projecting flange or molding 37 which is integrally formed with said plate, for the purpose which will be hereinafter described.

The cooking section of the stove includes outer housing 38 of substantially rectangular or square formation on horizontal cross-section, preferably made of tin sheet, suitably bent to affect side walls 39, front wall wall 40 and rear wall 41. To reenforce the structure of said outer housing 38 angle iron 42 is provided at each corner thereof; said angle iron 42 corresponding in width and thickness to the angle irons 30 which are employed with the fire section of the stove. Said angle irons 42 are attached to the walls of said outer housing 38 of the cooking section of the stove by means of bolts 43 and nuts 44, said nuts 44 being positioned inwardly of the outer housing 38. The lower ends of angle bars 42 extend below the lower ends of the walls of the outer housing 38 of the cooking section and are inwardly bent constituting elbows 45. The several walls of the fire section of the stove adjacent their corners are cut away as at 46 for accommodating the free and inwardly off-set ends of said angle bars 42 as clearly seen on Fig. 8. Portions of the several walls of the outer housing 38 are likewise cut away as at 47 to accommodate elbows 45 of the angle bars 42, as shown on Fig. 8. Otherwise the lower end of the outer housing 38 of cooking section of the stove rests upon the upper ends of walls of the fire section of the stove, as clearly seen on Figs. 2 and 6.

The cooking section of the stove further includes the inner section likewise made of tin sheet or other like material and constitutes side walls 48 and rear wall 49 all made of single piece suitably bent. The front edges of the side walls 48 of said inner housing are directly affixed to the front wall 40 of the outer housing 38, as clearly seen on Fig. 4. The side and rear walls of said inner housing are spaced from the side and rear walls of the outer housing 38 as clearly seen on Figs. 4 and 6.

The lower ends of the inner housing of the cooking section of the stove is receivable within molding 37 of plate 32, the latter abutting the outer faces of walls 48 and 49, thus preventing any smoke or combustion gases from entering the inner housing of the cooking section of the stove.

The front wall 40 of the outer housing 38 is provided with door 50 providing a communication with said inner housing.

The invention further includes a top plate or cover 51 fitting over the upper ends of the outer and inner housings of the cooking section of the stove, it having a downwardly depending and integrally formed flange 52 at its edge suitably formed and shaped to fit and abut the outer faces of the side, front and rear walls of the outer housing 38 of the cooking section of the stove, as well as the outer faces of angle bars 42. Said cover 51 is further provided with an integrally formed and downwardly depending flange or molding 53 adjacent side and rear edges thereof for receiving therewith in the upper end of inner compartment of cooking section of the stove, including side walls 48 and rear wall 49, as clearly seen on Figs. 1 and 2.

Said cover 51 at its rear end has an upwardly projecting chimney section 54 for the purpose of connecting to chimney pipe 55.

Centrally of said cover 51 there is an opening 56 provided with a sliding plate 57 movable within guard plate 58 which is affixed to said cover 51. When the inner housing of the cooking section of the stove is not utilized for cooking purposes said sliding plate 57 may be withdrawn from the opening 56 permitting the heat to escape through said opening 56 to the dwelling.

Adjacent the upper end of rear wall 49 of the inner housing a circular damper plate 59 is provided, for affording a communication with the space between the inner and outer housings and the chimney, for regulating the heat within the inner housing when the same is used for cooking purposes; also when it is not desired to permit the heat to escape to the dwelling through opening 56. Also any cooking odors within inner housing may be permitted to escape to the chimney through said damper plate 59. Rod 60, connecting with said damper plate 59 is passed outwardly through the front wall 40 and terminates in a handle 61 for the purpose of manually shutting or opening damper plate 59.

Positioned adjacent the lower end of the cooking section of the stove and between walls 41 and 49 of the outer and inner housings of said cooking section of the stove and above opening 35 is a damper plate 62 pivoted upon pin 63 set by its ends within side walls of the outer housing 38 of the cooking section of the stove and within the corresponding portions of angle bars 42. One of the ends of said pin terminates in handle 64 by means of which said plate 62 may be manually closed, as shown by full lines on Fig. 2, or opened, as shown by dotted lines. When the inner housing of the cooking section of the stove is used for cooking purposes and it is desirable to cause the heat and combustion gases to pass through openings 34 upwardly rather than through rear opening 35, then said damper plate 62 may be closed, in which event the heat in the inner cooking housing will be increased. Otherwise, when said plate 62 is opened, the smoke and heat will have the tendency to pass to the chimney more directly through opening 35 and the space between the rear walls 41 and 49 and then to the chimney.

From the hereinabove description it will be apparent that the invention which I have provided is very simple in construction, is made of many parts which are detachable and which may be easily replaced when damaged.

While there is described herein a preferred embodiment of the present invention, it is nevertheless to be understood that minor changes may be made therein without departing from the spirit and scope of the invention as claimed.

What I claim as new is:

1. A combined heating and cooking stove comprising a lower fire section, an inwardly extending ledge from the upper end thereof, a cooking plate, a plurality of arms laterally extending from said cooking plate, one edge of said cooking plate resting upon portion of said ledge, said arms resting upon the remaining portion of said ledge, an outer housing positioned upon the upper end of said fire section, a cover positioned upon said outer housing, a U-shaped molding upwardly projecting from said cooking plate, a U-shaped molding downwardly projecting from said cover, said two moldings being in spaced relation with the three adjacent sides of said outer housing, and an inner housing, said inner housing being of U-shaped formation on horizontal plane, its sides being in spaced relation with three walls of said outer housing, the side walls of said inner housing being affixed at their free edges to one wall of said outer housing, the ends of said inner housing being enclosed by and in abutment with said two moldings.

2. A combined heating and cooking stove having a fire section, comprising a plurality of walls, a bottom wall, means associating with said walls for supporting said bottom wall, a ledge inwardly extending from said walls, a lattice frame supportable upon said ledge, a plate resting upon said lattice frame, the edges of said plate being spaced from said walls for effecting opening through which smoke and combustion gases may travel upwardly, fire pot integrally formed with said plate and downwardly depending therefrom, a flange inwardly extending from said walls adjacent the upper ends thereof, and cooking housing positioned upon said flange.

3. A combined heating and cooking stove having a fire section, comprising a plurality of walls, a bottom wall, means associating with said walls for supporting said bottom wall, a ledge inwardly extending from said walls, a lattice frame supportable upon said ledge, a plate resting upon said lattice frame, the edges of said plate being spaced from said walls for effecting opening through which smoke and combustion gases may travel upwardly, fire pot integrally formed with said plate and downwardly depending therefrom, a flange inwardly extending from said walls adjacent the upper ends thereof, an outer housing, and an inner housing, said housings being spaced from each other for allowing further upward travel of smoke and combustion gases, both of said housings resting upon said flange.

4. In a combined heating and cooking stove, a fire section comprising a plurality of walls, angle bars connecting the adjacent edges of said walls, a cooking housing corresponding in formation on horizontal plane to the formation of said fire casing on horizontal plane, said cooking section resting upon the upper end of said fire section, and angle bars affixed to the corners of said cooking section and extending by their lower ends below the lower end of said cooking section, said free lower ends of said last named bars being inwardly bent to contact with the inner faces of said first named angle bars, the walls of said fire section adjacent the upper ends of said first named bars being cut away to accommodate the lower ends of said second named bars.

In testimony whereof I affix my signature.

JOSEPH BULKOWSKI.